(12) United States Patent
Sidorov et al.

(10) Patent No.: US 7,887,888 B1
(45) Date of Patent: Feb. 15, 2011

(54) METHODS AND SYSTEMS FOR FABRICATION OF GRAPHENE NANORIBBONS

(75) Inventors: Anton N. Sidorov, Louisville, KY (US); P. John Ouseph, Louisville, KY (US); Gamini Sumanasekera, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 60 days.

(21) Appl. No.: 12/489,903

(22) Filed: Jun. 23, 2009

(51) Int. Cl.
*B05D 1/04* (2006.01)
(52) U.S. Cl. .................. 427/472; 427/457; 427/458
(58) Field of Classification Search .......... 427/457, 427/458, 472
See application file for complete search history.

(56) References Cited

U.S. PATENT DOCUMENTS

| 7,790,242 B1 * | 9/2010 | Sumanasekera et al. ..... 427/458 |
| 2006/0014202 A1 * | 1/2006 | Watanabe et al. .............. 435/6 |
| 2009/0127514 A1 * | 5/2009 | Korkut et al. ............... 252/500 |

OTHER PUBLICATIONS

Bolotin et al., "Temperature-Dependent Transport in Suspended Graphene," Phys. Ref. Lett., 2008, 101, pp. 096802-1 to 096802-4.
Liang et al., "Electrostatic Force Assisted Exfoliation of Prepatterned Few-Layer Graphenes into Device Site," Nano Lett, 2009, 9(1), pp. 467-472.
Li et al., "Chemically Derived, Ultrasmooth Graphene Nanopribbon Semiconductors," Science, 2008, 319, pp. 1229-1232.

* cited by examiner

*Primary Examiner*—Frederick J Parker
(74) *Attorney, Agent, or Firm*—Stites & Harbison, PLLC; David W. Nagle, Jr.; Terry L. Wright

(57) ABSTRACT

A method for fabricating graphene nanoribbons comprises the steps of providing a chamber with a first and a second cavity, which are separated by a divider that defines an opening to place the first cavity in fluid communication with the second cavity; positioning a graphite sample in the first cavity; positioning a container with a metal disposed therein in the second cavity; heating the container to expel a cloud of metal; injecting a gas into the second cavity to propel the cloud of metal through the opening and into the first cavity where it contacts the graphite sample to produce dislocation bands; removing the graphite sample from the chamber; and electrostatically depositing the dislocation bands on a substrate as graphene nanoribbons.

13 Claims, 3 Drawing Sheets

US 7,887,888 B1

METHODS AND SYSTEMS FOR FABRICATION OF GRAPHENE NANORIBBONS

TECHNICAL FIELD

The presently-disclosed subject matter relates to systems and methods for fabricating graphene nanoribbons. In particular, the presently-disclosed subject matter relates to systems and methods for fabricating graphene nanoribbons whereby dislocation bands are produced on a graphite surface and electrostatically deposited onto a desired substrate as graphene nanoribbons.

BACKGROUND

Graphene is a single planar sheet of $sp^2$ bonded carbon atoms. Monolayers to several layers of this two-dimensional structure have been widely examined not only for their interesting physical and chemical properties, but also as potential materials for electronic devices. Graphene provides remarkable transport properties such as high carrier mobility, room temperature quantum hall effect, and ballistic transport. Two-dimensional graphene, however, is a semi-metal with a zero band and is generally not suitable for transistor applications. To that end, graphene nanoribbons, with widths small enough to impose lateral confinement effects, are expected to open up a band gap making them a semiconductor.

Lithographical patterning of large graphene layers has been widely used to create large graphene ribbons with rough edges (Bolotin, et al. 2008). Further, lithographic techniques have been used in conjunction with electrostatic force to obtain narrower graphene ribbons (Liang, et al. 2009). In both of these lithography-based techniques, the graphene ribbons that are produced exhibit rough edges making them unsuitable for many semiconductor applications. Alternative methods, such as chemical methods for producing graphene nanoribbons, have produced graphene nanoribbons with smooth edges, but these techniques have required extensive chemical treatments to produce the nanoribbons (Li, et al. 2008). In any event, known methods of producing graphene ribbons, including graphene nanoribbons, are only capable of producing graphene ribbons with rough edges or are only capable of producing graphene nanoribbons with smooth edges after extensive chemical treatments. Furthermore, none of the known methods address how to produce long, narrow, and smooth-edged graphene nanoribbons without extensive chemical treatments and then transfer these graphene nanoribbons to a desired substrate, which is of great importance in constructing semiconductors.

SUMMARY

The presently-disclosed subject matter includes systems and methods for fabricating graphene nanoribbons.

In some embodiments of the presently-disclosed subject matter, a method for fabricating graphene nanoribbons is provided. In some embodiments of the presently-disclosed methods, a chamber defining a first cavity and a second cavity is initially provided where the first cavity and the second cavity are separated by a divider that defines an opening, which places the first cavity in fluid communication with the second cavity. Then, a graphite sample, such as a highly oriented pyrolitic graphite (HOPG) sample, is positioned within the first cavity. A container with a metal disposed therein is then positioned in the second cavity, and is subsequently heated to expel a cloud of metal from the container. A gas is injected into the second cavity of the chamber. The injected gas is used to propel the cloud of metal through the opening in the divider and into the first cavity such that the cloud of metal contacts the graphite sample and produces dislocation bands on the graphite sample. The graphite sample is then removed from the chamber, and the dislocation bands are electrostatically deposited onto a substrate as graphene nanoribbons.

In some embodiments, one or more valves are operably connected to the chamber to control the flow of gas or air in the chamber, or to control the pressure within the chamber. For example, in some embodiments, an injector valve is operably connected to the second cavity of the chamber to provide a means for injecting gas into the chamber. As another example, in some embodiments, an evacuator valve is operably connected to the second cavity of the chamber to provide a means for evacuating air from the chamber. As yet another example, in some embodiments, a pressure-release valve is operably connected to the first cavity of the chamber to provide a means for controlling pressure within the chamber.

Further provided in some embodiments of the presently-disclosed matter are systems for fabricating graphene nanoribbons. In some embodiments, the system comprises: a chamber defining a first and second cavity, which are separated by a divider that includes an opening to place the first cavity in fluid communication with the second cavity; a graphite sample disposed in the first cavity; a container positioned in the second cavity having a metal disposed therein; a means for heating the container to expel a cloud of metal from the container; a means for injecting a gas into the second cavity of the chamber; and a means for electrostatically depositing dislocation bands from a graphite sample onto a substrate.

Thus, the methods and systems of the presently-disclosed subject matter allow for the production of dislocation bands on a graphite sample, which can then be electrostatically deposited on a suitable substrate as graphene nanoribbons. The methods and systems of the presently-disclosed subject matter also require minimal resources and labor, yet allow for the production of long, narrow graphene nanoribbons with smooth edges without the use of any chemical treatments.

DESCRIPTION OF EXEMPLARY EMBODIMENTS

The presently-disclosed subject matter includes methods and systems for fabricating graphene nanoribbons.

It has been observed that impacting a graphite sample, for example, freshly cleaved highly oriented pyrolytic graphite (HOPG), with micro-sized clusters of metal at high velocity produces dislocation bands on the surface of the graphite, with a width in the range of 10-100 nm and a length in the range of micrometers. Crystallographic stacking of graphite layers along these dislocation bands is different from that of normal graphite. Normal graphite has "aba" stacking, whereas the dislocation bands are observed to have "abc" stacking. As such, the charge density along a dislocation band is fifty-percent higher than the charge density of a normal graphite structure and, with the "abc" stacking, the separation between the "b" and "c" layers is larger than that of the "b" and "a" layer. If a graphite sample with dislocations is placed in an electric field, the force experienced by the regions of dislocation is much larger than that experienced by the rest of the graphite surface, and is thus sufficient to remove only the dislocations from the graphite surface such that dislocation bands can be deposited onto a suitable substrate to produce graphene nanoribbons.

Figure 1:
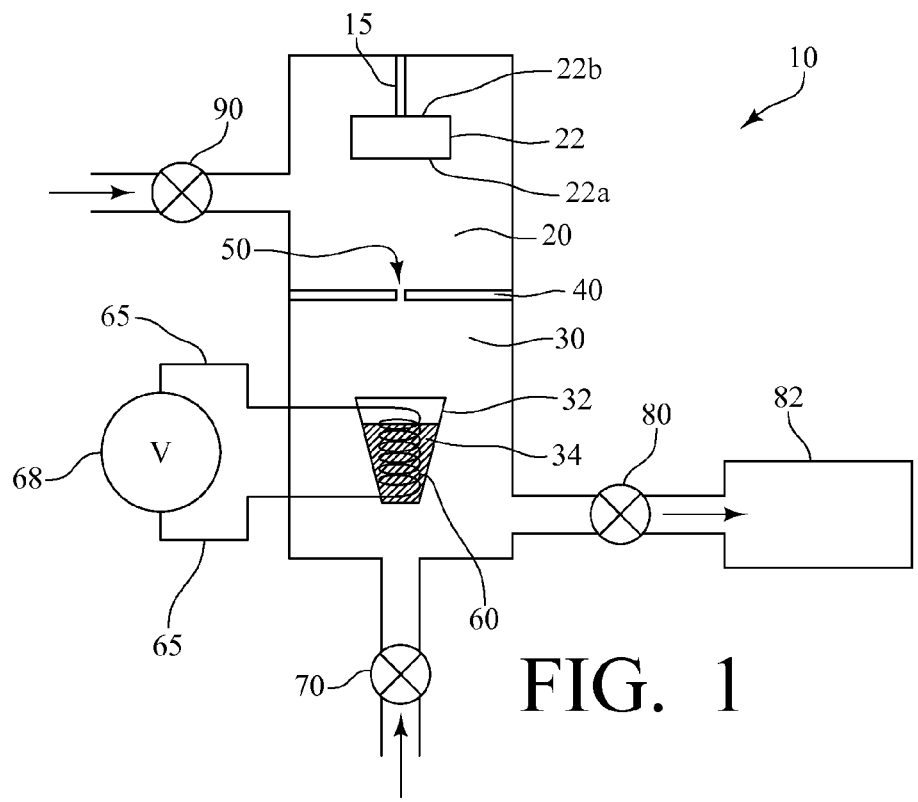
FIG. 1 is a schematic representation of an exemplary method for fabrication of graphene nanoribbons in accordance with the presently-disclosed subject matter, in which a graphite sample and a container with a metal disposed therein are positioned in a chamber.

FIG. 1 is a schematic representation of an exemplary method for fabrication of graphene nanoribbons in accordance with the presently-disclosed subject matter. In this exemplary implementation, a chamber 10, such as a high vacuum chamber, is first provided that defines a first cavity 20 and a second cavity 30. The first cavity 20 and second cavity 30 are separated by a divider 40 that defines an opening 50. The opening 50 places the first cavity 20 in fluid communication with the second cavity 30.

Referring still to FIG. 1, a graphite sample 22 is then positioned within the first cavity 20. In this exemplary implementation, one side 22a of the graphite sample 22, in this case a HOPG sample, is first cleaved using scotch tape before the graphite sample 22 is positioned within the first cavity 20 of the chamber 10. Then, the other side 22b of the graphite sample 22 is secured to the chamber 10. In this exemplary implementation, the other side 22b of the graphite sample 22 is attached to a rod 15, which is attached to a wall of the chamber 10 in the first cavity 20. Of course, to the extent it may be desired, the graphite sample 22 can be positioned in the first cavity 20 of the chamber 10 by various other means, as will be recognized by those skilled in the art.

Referring still to FIG. 1, a container 32, such as a crucible, with a metal 34 disposed therein is then positioned in the second cavity 30 of the chamber 10. Various metals can be used in accordance with the presently-disclosed methods, including metals of varying boiling temperatures. In this exemplary implementation, the metal 34 is a low-boiling temperature metal, such as indium or gallium. By using the a low-boiling temperature metal, a cloud of metal can readily be created upon heating of the container 32.

With respect to the exemplary implementation illustrated in FIG. 1, one or more valves can also be provided for controlling pressure within the chamber 10 and/or for evacuating air from the chamber 10. For example, in the exemplary implementation illustrated in FIG. 1, a pressure-release valve 90 is provided, which is operably connected to the first cavity 20 of the chamber 10 to provide a means for controlling pressure within the chamber 10. As another example, in the exemplary implementation illustrated in FIG. 1, an evacuator valve 80 is also provided, which is operably connected to the second cavity of the chamber to provide a means for evacuating air from the chamber 10. In some implementations, and as illustrated in FIG. 1, the evacuator valve 80 can further be connected to a pump 82 to more readily evacuate air from the chamber 10.

Referring still to FIG. 1, a means 60 for heating the container 32, such as a resistive heater, surrounds the container 32, and is also attached to electrodes 65. The electrodes 65 are further attached to a power source 68 such that, when the power source 68 is used to apply a voltage, the container 32 and the metal 34 disposed therein are heated.

Referring still to FIG. 1, the graphite sample 22 is typically positioned in the first cavity 20 of the chamber 10 over the opening 50 in the divider 40, and the container 32, having the metal 34 disposed therein, is typically positioned in the second cavity 30 of the chamber 10 under the opening 50 in the divider 40. Air is evacuated from the chamber 10 by turning the evacuator valve 80 to an open position and using the pump 82 to pull air from the chamber 10, and thereby produce a lower mTorr pressure within the chamber 10 (for example, a pressure under approximately $2 \times 10^{-3}$ Torr.) Once the pressure inside the chamber 10 reaches a predetermined value, the evacuator valve 80 is then turned to a closed position.

Figure 2:
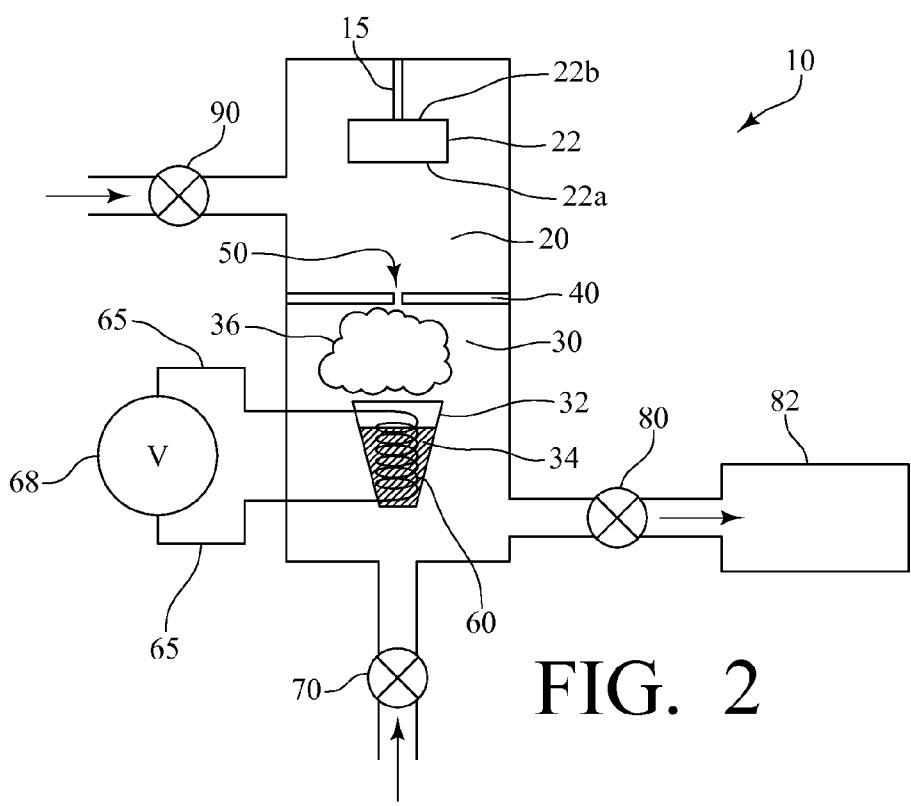
FIG. 2 is a schematic representation similar to FIG. 1, but further illustrating the formation of a cloud of metal by heating the container with the metal disposed therein.

Referring now to FIG. 2, the power source 68 is then used to apply a necessary voltage to the heating means 60 surrounding the container 32. In the exemplary implementation illustrated in FIG. 2, the applied voltage (e.g., 140 V and 15 A) is sufficient to raise the temperature of the container 32 and the metal 34 to or above the boiling temperature of the metal 34. Once the metal 34 attains boiling temperature, a cloud of metal 36 (e.g., a cloud of metal clusters) is created above the container 32. Then, the voltage applied to the heating means 60 surrounding the container 32 is disconnected after a few seconds. In some embodiments, the amount of time that the power source 68 is used to apply a necessary voltage to the heating means 60 can vary depending on the type and quantity of metal 34 used, as a greater amounts or different types of metals may require longer amounts of time to attain boiling temperature.

Of course, the power of the heating means 60 depends on the available current, as evidenced by the equation $P = I^{2}R$; where P is power, I is current, and R is the resistance of the heating means 60. In some exemplary implementations, the voltage that is applied to the heating means 60 can be reduced, and the current that is available to the heating means 60 can be increased, by using a step-down transformer.

Figure 3:
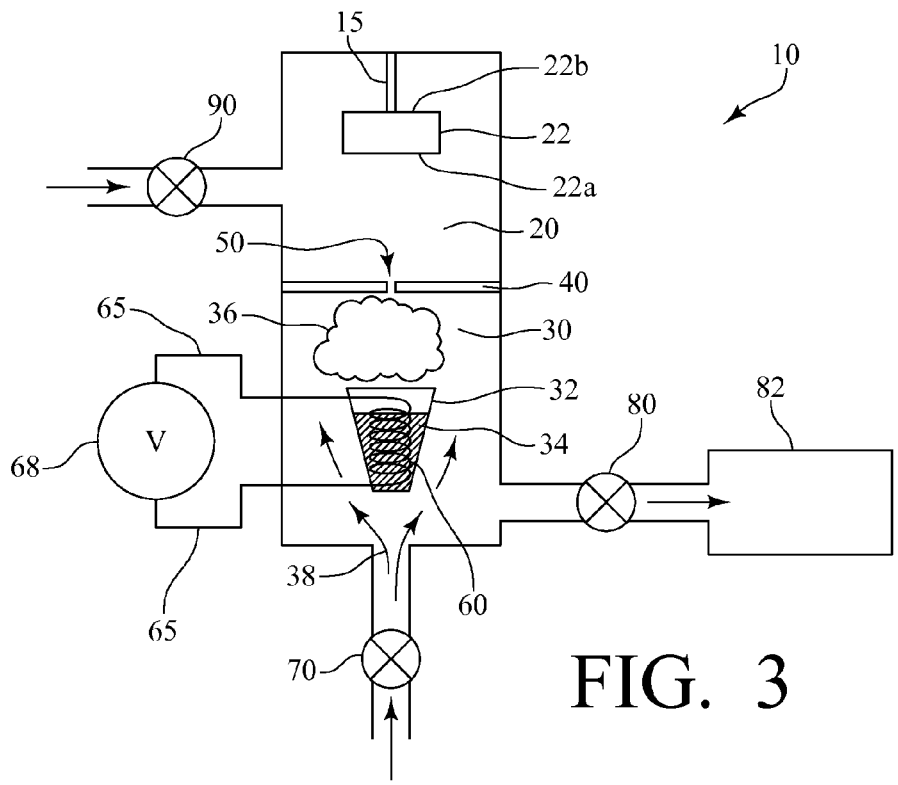
FIG. 3 is a schematic representation similar to FIGS. 1-2, but further illustrating a gas being injected into the second cavity of the chamber.

Referring now to FIG. 3, an inert gas, such as argon gas, which is non-reactive with the metal 34 or the cloud of metal 36, is then injected into the second cavity 30 of the chamber 10 by using a means for injecting the gas into the chamber 10, as indicated by arrows 38. In this exemplary implementation, and as illustrated in FIG. 3, the means for injecting the gas into the chamber is an injector valve 70. However, it is further contemplated that various other means for injecting a gas into the chamber 10 could be provided without departing from the spirit and scope of the presently-disclosed subject matter.

By using the injector valve 70 as a means for injecting the gas into the chamber 10, the injection of the gas into the chamber 10 can be controlled such that, immediately upon opening the injector valve 70, high pressure gas (25-35 psi) fills the second cavity 30 of the chamber 10. As described above, the chamber 10 is at a lower mTorr pressure due to the evacuation of air from the chamber 10. By providing this lower pressure in the chamber 10, when the high pressure gas is injected into the chamber 10, a suitable pressure ratio is created such that the high pressure gas enters the chamber 10 as a jet of gas. To provide further control over the injection of the gas and over the opening and closing of the injector valve 70, in some implementations, the injector valve 70 can be further attached to a pair of electrodes and to a power source, such that, upon applying a voltage to the injector valve 70, the injector valve 70 can be immediately opened or closed.

Figure 4:
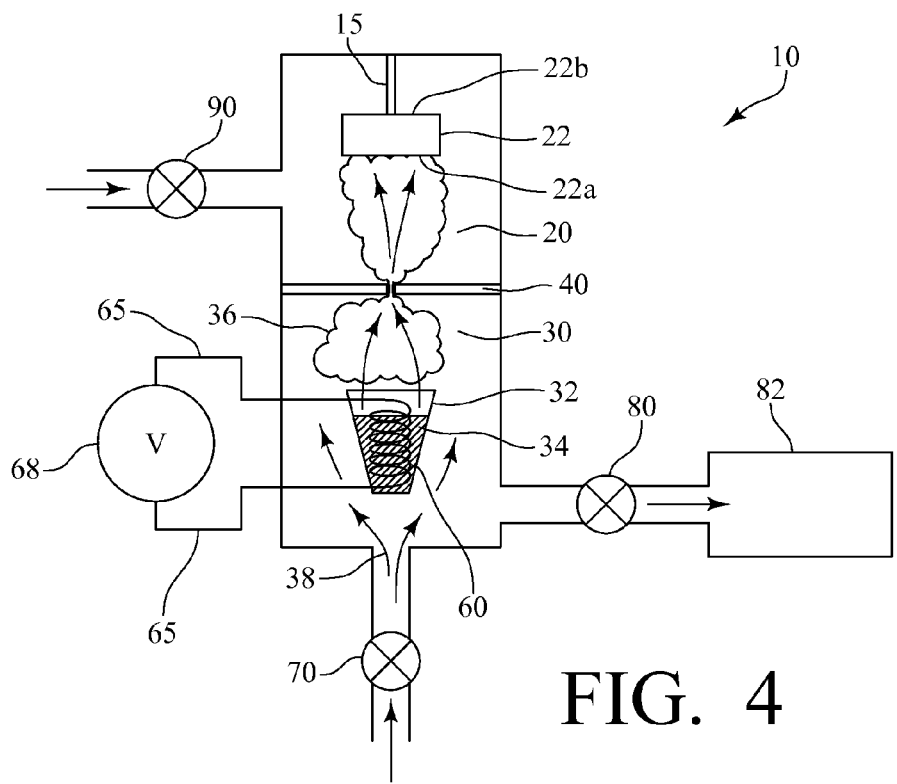
FIG. 4 is a schematic representation similar to FIGS. 1-3, but further illustrating the cloud of metal contacting the graphite sample.

Referring now to FIG. 4, the injection of the gas into the second cavity 30 of the chamber 10 propels the cloud of metal 36 through the opening 50 in the divider 40 and into the first cavity 20, where the cloud of metal 36 and its associated metal clusters contact the graphite sample 22 and produce dislocation bands on one side 22a of the graphite sample 22. With respect to this exemplary implementation illustrated in FIG. 4, it has been experimentally observed that by injecting gas at a high pressure, the speed of the metal clusters within the cloud of metal 36 is in the range of 1 m/s to 50 m/s. Of course, to the extent necessary, the speed of the metal clusters can be adjusted by varying the pressure of the gas.

Furthermore, with respect to the exemplary implementation depicted in FIG. 4, it has also been experimentally observed that the metal clusters, within the cloud of metal 36, impact the side 22a of the graphite sample 22 and produce a variety of surface distortions, including dislocation bands and nanocraters, with dislocation bands radiating from the center of the impact. It has further been experimentally observed that metal clusters hitting the side 22a of the graphite sample 22 at angles greater than ninety-degrees produce dislocation bands, which may subsequently be used to fabricate graphene nanoribbons.

Following the production of the dislocation bands on the graphite sample 22, the graphite sample 22 is removed from the chamber 10. The dislocation bands are then removed from the graphite sample 22 by electrostatically depositing the bands on a suitable substrate. In the exemplary implementation depicted in FIG. 5, to electrostatically deposit the dislocation bands onto a substrate, the side 22b of the graphite sample 22 that is opposite the side 22a containing the dislocations bands, is first secured to an electrode 120. This electrode is then electrically connected to the positive terminal of a power source 168 (e.g., 50 V). A second electrode 122 is then electrically connected to the ground terminal of the power source 168. An insulator 140 is also placed on the second electrode 122, which is intended to prevent a short circuit between the first and second electrodes 120, 122.

Figure 5:
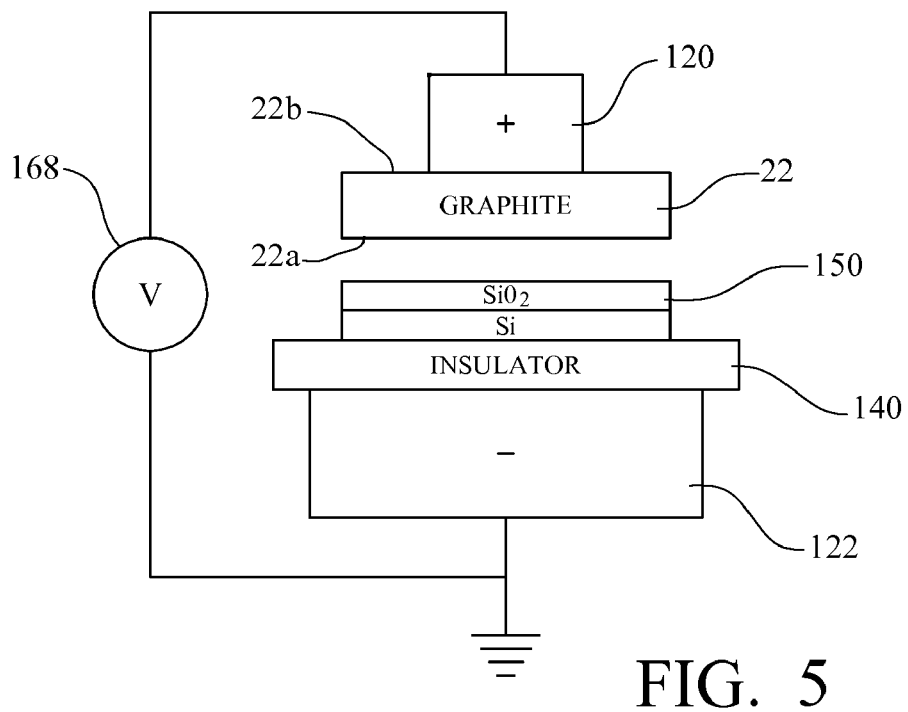
FIG. 5 is a schematic representation that depicts the step of electrostatically depositing dislocation bands on a substrate.

Referring still to FIG. 5, a substrate 150 is then placed on the insulator 140. Various materials could be used as a substrate, including both conducting and non-conducting materials. In this exemplary implementation, and as shown in FIG. 5, the substrate 150 is a 300-nm thick silicon dioxide ($SiO_2$) layer on a silicon layer (500 μm thick). By using the power source 168 to apply a voltage, dislocation bands are then pulled from the graphite sample 22 by an electrostatic attractive force and deposited on the substrate 150 as graphene nanoribbons.

Figure 6:
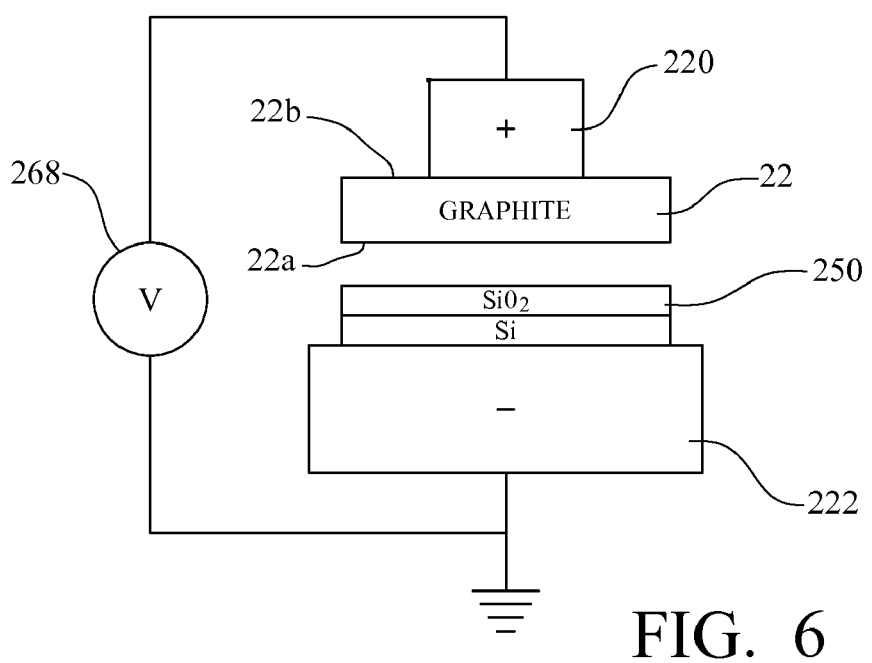
FIG. 6 is a schematic representation that depicts the step of electrostatically depositing dislocation bands on a substrate where no insulator is interposed between the second electrode and the substrate.

FIG. 6 is a schematic representation that depicts the step of electrostatically depositing dislocation bands on a substrate 250 where no insulator is interposed between the second electrode 222 and the substrate 250. Similar to the implementation described above with reference to FIG. 5, the side 22b of the graphite sample 22 that is opposite the side 22a containing the dislocations bands, is first secured to an electrode 220. This electrode is then electrically connected to the positive terminal of a high-voltage power source 268. A second electrode 222 is then electrically connected to the ground terminal of the power source 268. A substrate 250 is placed on the second electrode 222, with no insulator interposed between the second electrode 222 and the substrate 250. Such a configuration is possible provided that the current is controlled in a manner that prevents a short circuit between the first and second electrodes 220, 222. Again, when the power source 268 is used to apply a voltage, the dislocation bands are pulled from the graphite sample 22 by an electrostatic attraction force and deposited on the substrate 250 as graphene nanoribbons. For further guidance regarding the electrostatic deposition of graphene on a substrate, see commonly assigned U.S. patent application Ser. No. 12/248,096 entitled "Method For Electrostatic Deposition Of Graphene On A Substrate," which is incorporated herein by this reference.

By electrostatically depositing the dislocation bands on a substrate in the above-described manner, the present method produce graphene nanoribbons that are about 30 nm in width, but can also be used to generate graphene nanoribbons with considerably smaller widths. For example, it is contemplated that graphene nanoribbons of varying size, including graphene nanoribbons with widths smaller than 30 nm, can be generated by controlling the impact velocity of the metal clusters and the direction in which the metal clusters contact the graphite sample.

Referring now to FIGS. 1 and 5, further provided, in some embodiments of the presently-disclosed subject matter, are systems for fabricating graphene nanoribbons that can be used in accordance with the above-described methods. As illustrated in FIGS. 1 and 5, in some embodiments, an exemplary system is provided that comprises a chamber 10 defining a first cavity 20 and second cavity 30, which are separated by a divider 40 defining an opening 50 that places the first cavity 20 in fluid communication with the second cavity 30; a graphite sample 22 positioned within the first cavity 20; a container 32, with a metal 34 disposed therein, positioned in the second cavity 30; a means 60 for heating the container 32 to expel a cloud of metal from the container 32; a means for injecting a gas into the second cavity 30 of the chamber 10, such that the gas can propel a cloud of metal through the opening 50 defined by the divider 40 and into the first cavity 20 of the chamber 10 where it contacts the graphite same 22 to produce dislocation bands; and a means for electrostatically depositing the dislocation bands on a substrate to thereby produce graphene nanoribbons.

As a further refinement, and similar to the above-described methods, in some embodiments of the presently-disclosed systems, the means for injecting gas into the second cavity 30 of the chamber 10 can comprise an injector valve 70 that is operably connected to the second cavity of the chamber. Also similar to the above-described methods, the systems of the presently-disclosed subject matter can, in some embodiments, further include one or more valves for controlling pressure within the chamber 10 and/or for evacuating air from the chamber 10. For example, as illustrated in FIG. 1, an evacuator valve 80 can be operably connected to the second cavity 30 of the chamber 10 to provide a means for evacuating air from the chamber, and a pressure-release valve 90 can be operably connected to the first cavity 20 of the chamber 10 to provide a means for controlling pressure within the chamber 10.

As yet another refinement, the systems of the presently-disclosed subject matter further include, in some embodiments, a resistive heater that surrounds the container 32 and provides a means 60 for heating the container 32. For example, a resistive heater can be connected to a pair of electrodes 65 and a power source 68, such that the container 32 is heated when the power source 68 is used to apply a voltage to the resistive heater.

With respect to the means for electrostatically depositing the dislocation bands, as illustrated in FIG. 5, the systems of the presently-disclosed subject matter further include, in some embodiments, an electrode 120 to which a graphite sample 22 is secured, and which is electrically connected to a positive terminal of a power source 168 (e.g., 50 V). In this exemplary embodiment, the means for electrostatically depositing the dislocation bands also includes a second electrode 122 that is electrically connected to the ground terminal of a power source 168. Further, as also illustrated in FIG. 5, an exemplary means for electrostatically depositing the dislocation ribbons also includes a substrate 150 that can be positioned on an insulator 140 that can be further provided and placed directly on the second electrode 122. Alternatively, as shown in FIG. 6, in some embodiments of the presently-disclosed systems, a means for electrostatically depositing the dislocations bands can be provided where a substrate 250 is placed directly on a second electrode 222.

The above-described methods and systems for fabricating graphene nanoribbons, which allow for the deposition of graphene nanoribbons on a suitable substrate, are important both for producing long and narrow graphene ribbons with smooth edges and for developing graphene nanoribbon-based devices. For example, graphene nanoribbons can be deposited and positioned on delicate structures, such as electronic devices. Furthermore, the ability to obtain graphene nanoribbons with smooth edges without extensive chemical treatments provides a unique way to fabricate graphene nanoribbons without dramatically changing the properties of the graphene itself. Thus, the methods and systems of the presently-disclosed subject matter provide convenient alternatives to lithography-based or chemical-based techniques for fabricating graphene ribbons, with the added benefit that the edges of the graphene nanoribbons produced by the presently-disclosed methods and systems are sharp and straight, thus making them suitable as a field effect transistor.

Throughout this document, various references are mentioned. All such references are incorporated herein by reference and include the references set forth in the following list:

REFERENCES

1. Bolotin K I, Sikes K J, Hone J, Stormer H L, Kim P. Temperature-Dependent Transport in Suspended Graphene. *Phys. Rev. Lett.* 2008; 101: 096802.
2. Liang X, Chang A S P, Zhang, Y, Harteneck B D, Choo H, Olynick D L, Cabrini S. Electrostatic Force Assisted Exfoliation of Prepatterned Few-Layer Graphenes into Device Sites. *Nano Lett.* 2009; 9(1): 467-472.
3. Li X, Wang X, Zhang L, Lee S, Dai H. Chemically Derived, Ultrasmooth Graphene Nanoribbon Semiconductors. *Science*. 2008; 319: 1229-1232.
4. U.S. patent application Ser. No. 12/248,096, entitled "Method for Electrostatic Deposition of Graphene on a Substrate."

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to understood therefrom, for modifications will become apparent to those skilled in the art upon reading this disclosure and may be made without departing from the spirit or scope of the presently-disclosed subject matter.

What is claimed is:

1. A method for fabricating graphene nanoribbons, comprising the steps of:
providing a chamber defining a first cavity and a second cavity, said first and second cavities being separated by a divider, the divider defining an opening to place the first cavity in fluid communication with the second cavity;
positioning a graphite sample within the first cavity;
positioning a container in the second cavity, the container having a metal disposed therein;
heating the container to expel a cloud of the metal from the container;
injecting a gas into the second cavity of the chamber, the gas propelling the cloud of the metal through the opening defined by the divider and into the first cavity of the chamber where it contacts the graphite sample to produce dislocation bands on the graphite sample;
removing the graphite sample from the chamber; and
electrostatically depositing the dislocation bands on a substrate, such that the dislocation bands are removed from the graphite sample and deposited on the substrate as graphene nanoribbons.

2. The method of claim 1, wherein the graphite sample is positioned in the first cavity of the chamber over the opening defined by the divider, and wherein the container is positioned in the second cavity of the chamber under the opening defined by the divider.

3. The method of claim 1, wherein the step of heating the container is achieved by connecting the container to a resistive heater.

4. The method of claim 3, wherein the step of heating the container is further achieved by electrically connecting a pair of electrodes to the resistive heater and to a power source, such that the container is heated when the power source is used to apply a voltage to the resistive heater.

5. The method of claim 1, wherein an injector valve is operably connected to the second cavity to provide a means for injecting the gas into the chamber.

6. The method of claim 1, wherein an evacuator valve is operably connected to the second cavity of the chamber to provide a means for evacuating air from the chamber.

7. The method of claim 1, wherein a pressure-control valve is operably connected to the first cavity of the chamber to provide a means for controlling pressure within the chamber.

8. The method of claim 1, wherein the graphite sample is highly oriented pyrolytic graphite (HOPG).

9. The method of claim 8, and further comprising the step of cleaving the graphite sample to provide an appropriate surface for producing dislocation bands prior to positioning the graphite sample within the first cavity.

10. The method of claim 1, wherein the cloud of the metal contacts the graphite sample at an angle of greater than about 90 degrees.

11. The method of claim 1, wherein the metal is a low-boiling temperature metal.

12. The method of claim 11, wherein the low-boiling temperature metal is indium or gallium.

13. The method of claim 1, wherein the gas is an inert gas that is non-reactive with the metal.

\* \* \* \* \*